(12) United States Patent
Nishiyama et al.

(10) Patent No.: US 7,126,248 B2
(45) Date of Patent: *Oct. 24, 2006

(54) MOTOR WITH STATOR FORMED BY ASSEMBLING DIVIDED STATOR-MEMBERS INTO AN ANNULAR SHAPE, AND COMPRESSOR INCORPORATING THE SAME MOTOR

(75) Inventors: Noriyoshi Nishiyama, Izumiotsu (JP); Yasufumi Ikkai, Kobe (JP); Seiji Okazaki, Shijonawate (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/344,327

(22) Filed: Jan. 30, 2006

(65) Prior Publication Data

US 2006/0125340 A1 Jun. 15, 2006

Related U.S. Application Data

(63) Continuation of application No. 10/090,476, filed on Mar. 4, 2002, now Pat. No. 7,026,741.

(30) Foreign Application Priority Data

Mar. 2, 2001 (JP) .............................. 2001-057757

(51) Int. Cl.
*H02K 1/06* (2006.01)
*H02K 1/12* (2006.01)

(52) U.S. Cl. ...................................................... 310/217
(58) Field of Classification Search ......... 310/216–218
See application file for complete search history.

(56) References Cited

U.S. PATENT DOCUMENTS

| 1,756,672 | A | * | 4/1930 | Barr ............................ 310/259 |
| 3,122,667 | A | | 2/1964 | Baciu |
| 4,085,347 | A | | 4/1978 | Lichius |
| 4,103,195 | A | | 7/1978 | Torossian et al. |
| 4,238,879 | A | * | 12/1980 | Zurlinden et al. ............ 29/705 |
| 5,306,976 | A | | 4/1994 | Beckman |
| 5,477,096 | A | | 12/1995 | Sakashita et al. |

(Continued)

FOREIGN PATENT DOCUMENTS

CH 391 071 A 4/1965

(Continued)

OTHER PUBLICATIONS

Relevant portion of International Search Report of parent applicaiton's corresponding PCT Application PCT/JP2002/01834.

*Primary Examiner*—Tran Nguyen
(74) *Attorney, Agent, or Firm*—Rossi, Kimms & McDowell LLP

(57) ABSTRACT

A motor includes a stator formed by assembling plural divided-stator-members—each one of the members having a tooth—into an annular shape, and a rotor facing the stator. The divided stator members are formed by laminating plural core sheets and bonding at least parts of end faces along the laminating direction of the core sheets. This structure allows forming a lamination of the core sheets without welding, which avoids damaging electrical insulation between each core sheet. Eddy current thus does not increase at an inner rim of the stator, where magnetic flux intensely changes. The motor efficiency is, therefore, not adversely affected. As a result, a small, efficient and high performance motor in a simple structure is obtainable. A compressor employing the same motor and enjoying the advantages of the motor is also obtainable.

10 Claims, 6 Drawing Sheets

U.S. PATENT DOCUMENTS

| | | |
|---|---|---|
| 5,583,387 A | 12/1996 | Takeuchi et al. |
| 5,729,072 A | 3/1998 | Hirano et al. |
| 5,786,651 A | 7/1998 | Suzuki |
| 5,893,205 A * | 4/1999 | McClelland .................. 29/598 |
| 6,049,153 A | 4/2000 | Nishiyama et al. |
| 6,104,117 A | 8/2000 | Nakamura et al. |
| 6,751,842 B1 * | 6/2004 | Roesel et al. .................. 29/598 |

FOREIGN PATENT DOCUMENTS

| | | |
|---|---|---|
| JP | 7-170699 A | 7/1995 |
| JP | 8-149725 A | 6/1996 |
| JP | 11-308821 A | 11/1999 |

* cited by examiner

MOTOR WITH STATOR FORMED BY ASSEMBLING DIVIDED STATOR-MEMBERS INTO AN ANNULAR SHAPE, AND COMPRESSOR INCORPORATING THE SAME MOTOR

TECHNICAL FIELD

The present invention relates to a motor or an electric generator including a stator formed by assembling divided stator-members into an annular shape, and it relates to an efficient and a high performance compressor incorporating the same motor.

BACKGROUND ART

A stator having concentrated windings has been widely used in motors or electric generators. In the concentrated-winding stator, one-phase winding is wound on each tooth of the stator. This stator has an advantage that a height of the winding (winding-end section) can be lowered, so that the motor can be downsized. The concentrated winding stator has a small value of a wire-wound resistor, so that a small copper loss generated by a wire-wound current and a wire-wound resistor is expected. The motor thus can work efficiently. Further, normal winding on a slot section, which can accommodate the winding, increases a space factor of the winding in the stator. The wire-wound resistor value can be thus lowered, which achieves an efficient motor. Normal winding is provided to a stator-member divided corresponding to every one tooth of a stator. Then a plurality of teeth of the stator are linked into an annular shape. This is one of constructing methods of the concentrated winding stator. A linking section of every tooth wound with a wire is welded each other and formed into an annular stator.

In general, a stator is formed by laminating a plurality of core sheets of which thickness ranges from 0.5 to 0.2 mm. The surface of this core sheet is electrically insulated in order to reduce eddy current.

Each one of the teeth is formed by welding several spots on borders between laminated layers at right angles with respect to a direction of laminating the core sheets. The structure of each tooth is further described with reference to FIG. 7A and FIG. 7B. FIG. 7A is a front view of a tooth of a stator. FIG. 7B is an axial sectional view of the tooth of the stator, and illustrates a status of welded laminations of core sheets.

In FIGS. 7A and 7B, tooth 60 of the stator is formed by laminating a plurality of core sheets 61, and winding 63 is wound concentrically on the lamination via insulator 62. An end face of outer rim and an end face of inner rim of respective core sheets 61 are independently welded at welding spots 64.

However, this welding damages electrical insulation at welding spots 64 between the core sheets laminated. At the damaged spots, eddy current increases, and the motor efficiency lowers. An inner rim of the stator faces the rotor, and magnetic flux changes intensely on the inner rim. Therefore, the damages of insulation increases eddy current substantially, which results in lowering the motor efficiency.

Another laminating method uses adhesive core-sheets as material for insulating and coating the core-sheets. Adhesive has been applied to the adhesive core-sheets. These core-sheets are punched to shape into cores, and laminated in line. Then the laminated core-sheets are pressurized, heated, and bonded to be integrated into one unit. In the case of pursuing a highly efficient motor, the punched core-sheets are often annealed in order to remove distortion produced by the punching, because the distortion adversely affects magnetic characteristics. An example of an annealing condition is this; 800° C. for one hour; then cooling the sheets gradually.

However, the adhesive does not work at this annealing temperature, and the sheets cannot be properly annealed.

According to still another method of laminating the core-sheets, peaks and valleys provided to parts of the core-sheets are caulked. The caulked parts according to this method, however, adversely affects the magnetic characteristics, and lowers the motor efficiency. Further, in the case of a motor having a large axial measurement, i.e., a great thickness of lamination, deflection thicknesswise is produced due to resiliency at the caulked parts. This deflection is unfavorable to the motor, in particular, of which stator is formed by assembling a plurality of divided members.

SUMMARY OF THE INVENTION

The present invention addresses the problems discussed above, and aims to provide a small, efficient and high performance motor in a simple structure. The present invention also aims to provide a compressor incorporating the same motor.

The motor of the present invention comprises the following elements:
   (a) a stator formed by assembling a plurality of divided stator members having teeth into an annular shape; and
   (b) a rotor facing the stator.

Each one of the divided stator members is formed by laminating a plurality of core sheets and bonding at least parts of the end faces along the laminating direction of the core sheets with adhesive.

The compressor of the present invention includes this motor.

The structure of this motor allows forming a lamination of the core sheets without welding at an inner rim of the stator. The inner rim of the stator faces the rotor, and encounters intense change of magnetic flux. Therefore, electrical insulation between the core-sheets laminated is not damaged, which does not increase eddy current. The motor efficiency is thus not adversely affected. As a result, a small, efficient and high performance motor in a simple structure is obtainable.

DETAILED DESCRIPTION OF PREFERRED EMBODIMENTS

Exemplary embodiments of the present invention are demonstrated hereinafter with reference to the accompanying drawings.

First Exemplary Embodiment

Figure 1:
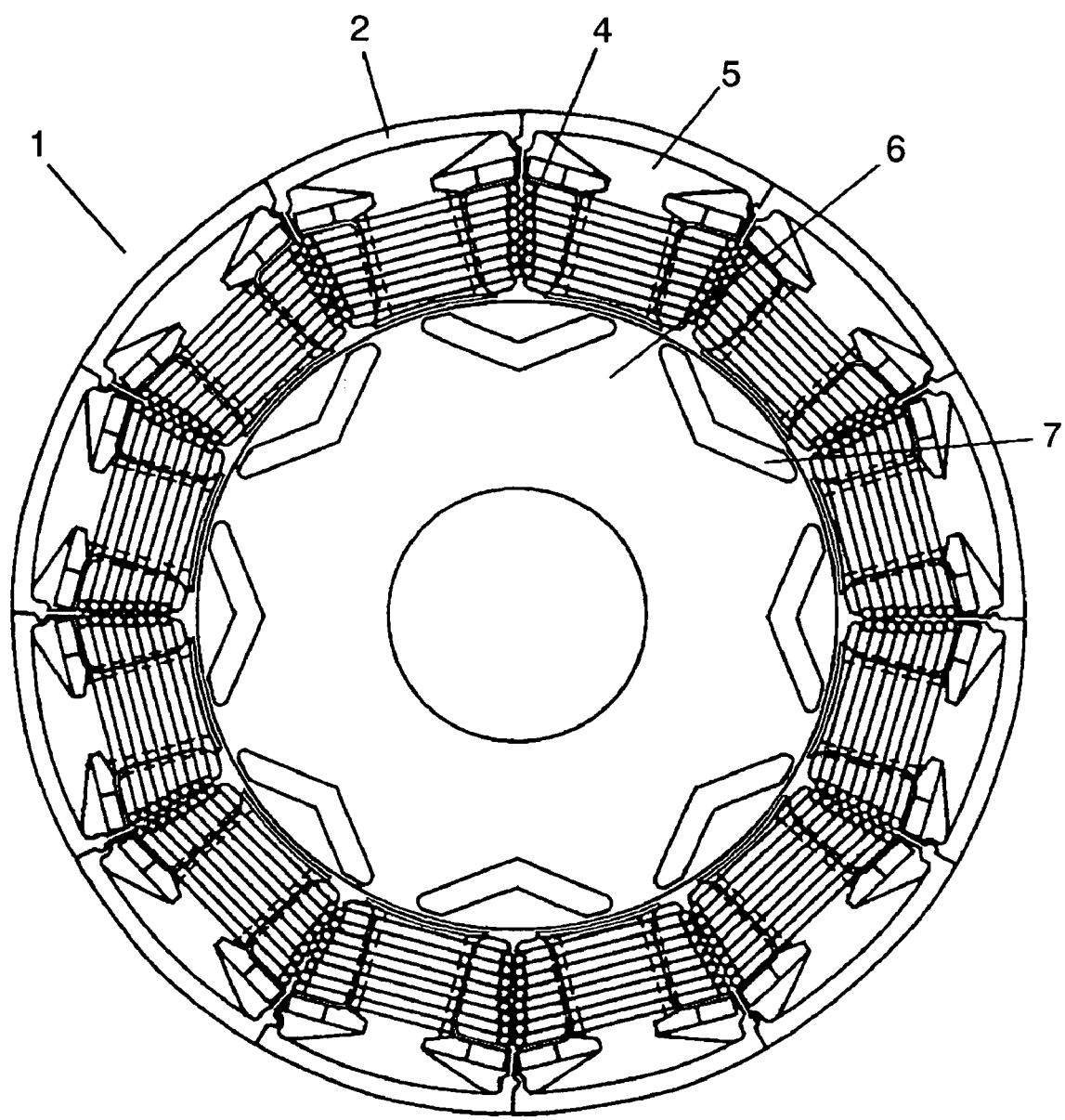
FIG. 1 is a front view of a motor employing a stator having concentrated windings in accordance with a first exemplary embodiment of the present invention.
Figure 2A:
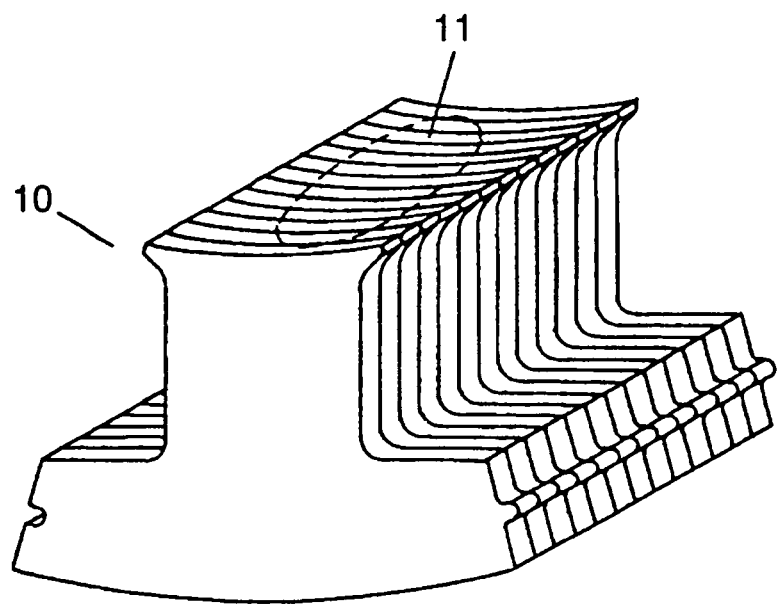
FIG. 2A and FIG. 2B are perspective views of a stator tooth of the motor shown in FIG. 1.
Figure 2B:
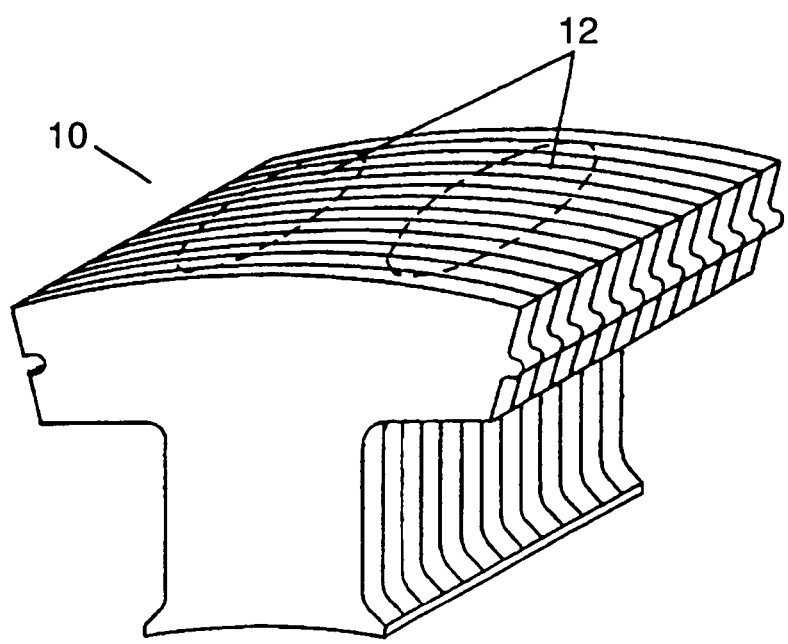

FIG. 1 is a front view of a motor employing a stator having concentrated windings in accordance with the first exemplary embodiment of the present invention. FIG. 2A and FIG. 2B are perspective views of a stator tooth of the motor shown in FIG. 1.

In FIG. 1, stator 1 is formed by assembling 12 pieces of divided stator members 2 into an annular shape. Each one of divided stator members 2 has a tooth, and has been wound with windings 4 in a concentrated manner via insulator 5. Rotor 6 has eight pieces of permanent magnets 7 within a core, and faces stator 1 via an annular space. Stator 1 and rotor 6 form a motor having interior magnets.

This first embodiment refers to the motor with interior magnets; however, the present invention is applicable to a motor with surface magnets, or a switched reluctance motor. In the motor with surface magnets, permanent magnets are disposed on a surface of a rotor core, and the switched reluctance motor uses a stator having concentrated windings. In this first embodiment, a motor having 12 stator teeth (12 slots) and 8 rotor poles is used; however, the present invention is not limited to this motor.

A tooth of the divided stator member is described hereinafter with reference to FIGS. 2A and 2B. Stator tooth 10 is formed by laminating a plurality of core sheets made of electromagnetic steel plate. At least parts of end faces along the laminating direction of the core sheets are bonded with adhesive. To be more specific, adhesive is infiltrated into end faces, of the core sheets laminated, along inner rim 11 and outer rim 12 of stator tooth 10. Instant adhesive of cyanoacrylate system is used, and this adhesive has a low viscosity of ca. not more than 100 mPa·S. In this first embodiment, when an annular stator is assembled with divided members of which teeth are wound with windings via insulator, the divided members are neither welded nor caulked as they are done in the conventional stator. Therefore, electrical insulation is not damaged at welded spots, and eddy current does not increase, which keeps the motor efficient. As a result, the first embodiment can provide a small, efficient and high performance motor using a concentrated winding stator in a simple structure.

Regarding the adhesive of a low viscosity ca. not more than 100 mPa·S, anaerobic adhesive or UV curing adhesive, for instance, can be used instead of the instant adhesive of cyanoacrylate system.

Second Exemplary Embodiment

Figure 3A:
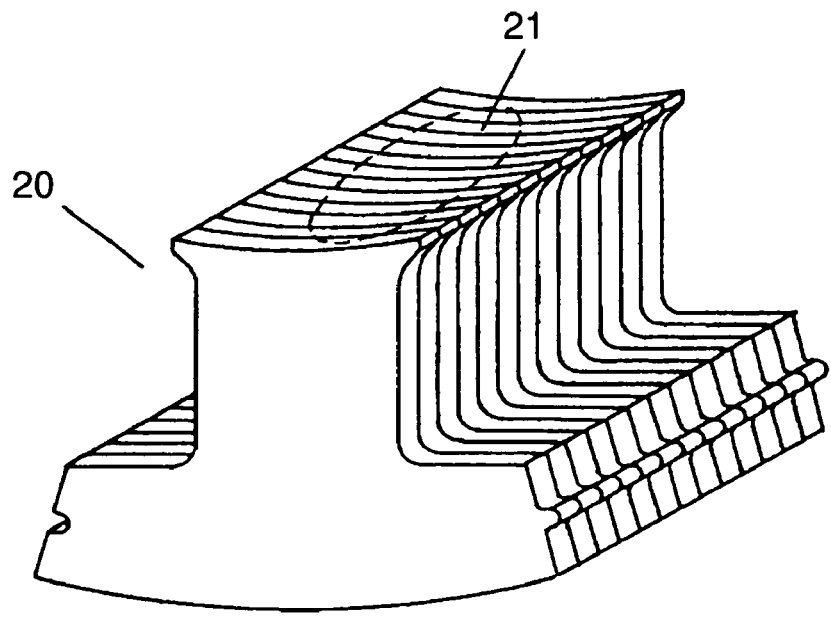
FIG. 3A and FIG. 3B are perspective view of a stator tooth of a motor in accordance with a second exemplary embodiment of the present invention.
Figure 3B:
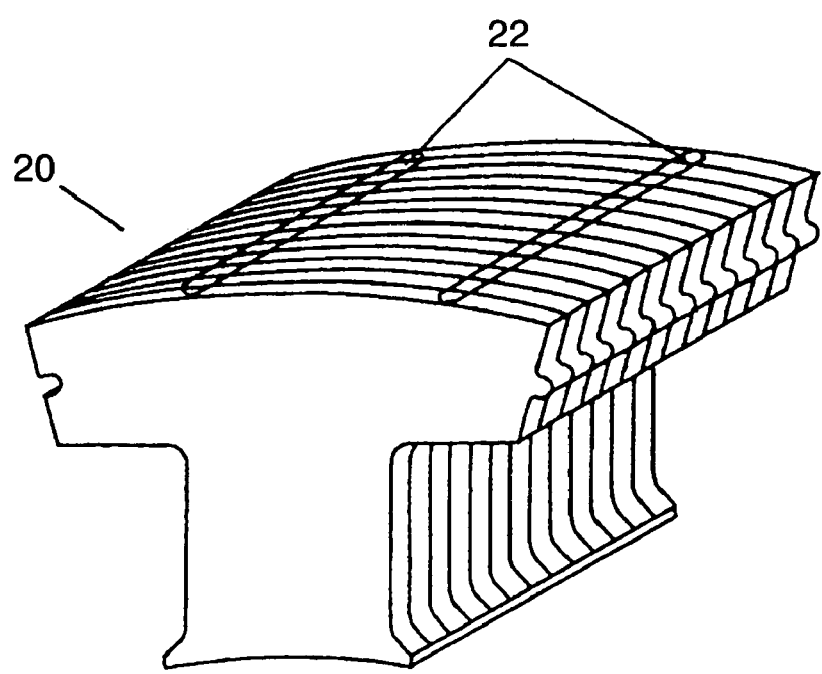

FIG. 3A and FIG. 3B are perspective view of a stator tooth of a motor in accordance with the second exemplary embodiment of the present invention. Stator tooth 20 is formed by laminating a plurality of core sheets made of electromagnetic steel plate. At least parts of end faces along the laminating direction of the core sheets are bonded with adhesive. To be more specific, adhesive is infiltrated into the end faces, of the core sheets laminated, along inner rim 21 of stator tooth 20, so that the core sheets are fixed to each other. As in the first embodiment, instant adhesive of cyanoacrylate system is used, and this adhesive has a low viscosity of ca. not more than 100 mPa·S.

In the core sheets laminated, parts of a tooth except a section (inner rim of the stator) facing a rotor are welded for fixing the core sheets. This is different from the first embodiment. To be more specific, parts of outer rim 22 (back face of the tooth) are welded, i.e., outer rim 22 does not face the rotor.

The inner rim of the stator encounters intense changes of magnet flux because the inner rim faces the rotor. Therefore, welding the inner rim would invite damages of insulation between the core sheets. In such a case, eddy current increases substantially, which lowers the motor efficiency. However, in this second embodiment, since the inner rim of the stator is not welded, high efficiency is still maintained.

Figure 4:
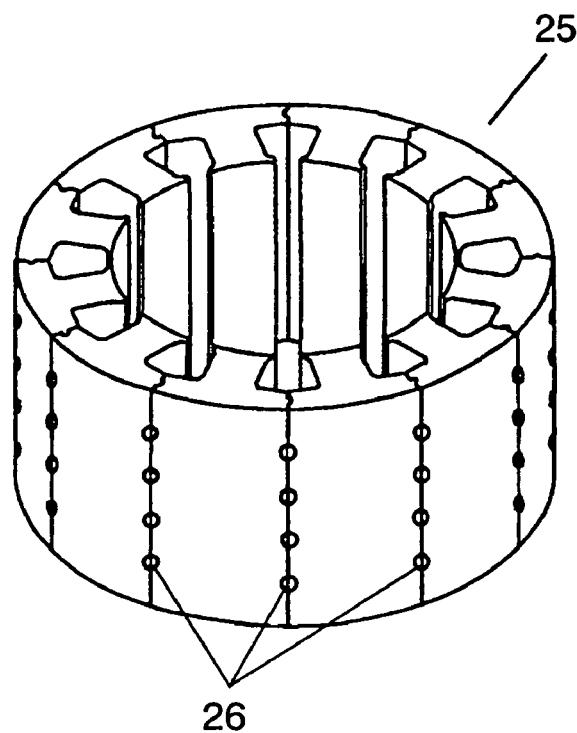
FIG. 4 is a perspective view of a stator of the motor in accordance with the second embodiment.

A method of welding the parts of the outer rim of the core sheets is detailed hereinafter. FIG. 4 is a perspective view of the stator of the motor in accordance with the second embodiment. FIG. 4 does not show windings or insulators but only shows welded spots on outer rim of stator 25 for making the description more understandable. As shown in FIG. 4, several spots are welded partially on the outer rim, so that substantial fixing strength is produced. This structure is thus applicable to a large size motor.

In this second embodiment, an annular stator is assembled with divided stator members of which teeth are wound with windings via insulators. When each one of the divided stator-members is formed, an inner rim—facing the rotor—of each member is not welded or caulked, but is bonded partially with adhesive. On the other hand, the outer rim is welded partially for fixing the core sheets to each other. The welded spots do not invite damages of insulation, and eddy current thus does not increase, which keeps the motor efficient. As a result, the second embodiment can provide a small, efficient and high performance motor using a concentrated winding stator in a simple structure.

Third Exemplary Embodiment

According to a method of integrating divided stator members into an annular shape, connecting sections on the outer rim of the divided members adjacent to each other are welded. In this case, a part of the adhesive evaporates into gas, which interferes with the welding. As a result, the annular stator invites weakness of strength and inaccuracy of precision.

Figure 5:
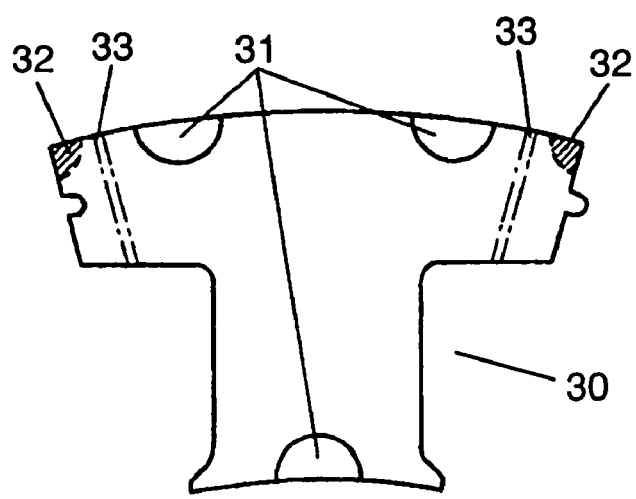
FIG. 5 is a plan view of a stator core-sheet of a motor in accordance with a third exemplary embodiment of the present invention.

A measure overcoming this problem is described here with reference to FIG. 5, which is a plan view of stator core-sheet of a motor in accordance with the third embodiment. In FIG. 5, core-sheet 30 includes bonding section 31, welding section 32, and area 33 between bonding section 31 and welding section 32. In bonding section 31, adhesive is infiltrated for bonding a plurality of the core sheets laminated, so that a divided stator member is constructed. At welding section 32, stator teeth adjacent to each other are welded into an annular shape for linking the divided stator-members adjacent to each other. Area 33 is a non-bonding section near welding section 32. In this third embodiment, area 33 is coated with water and oil repellent material, so that area 33 blocks the adhesive from infiltrating around the welding sections. Therefore, this structure prevents the gas produced by the adhesive from interfering with the welding. As a result, strong welding is achievable, which strengthens the stator and increases accuracy of the annular stator.

With regard to the coating, quick-drying coating agent of silicone system is effective. The coating agent can be applied to the core sheets after the punching and the annealing. If no annealing is taken, the coating agent can be applied to the core sheets during the punching.

In the third embodiment discussed above, an annular stator is assembled with divided members, of which teeth are wound with windings via insulators. When the stator is formed, the welding sections are welded and the core sheets are fixed in order to link the divided stator members adjacent to each other. The inner rim, facing the rotor, of each member is not welded or caulked, but is bonded partially with adhesive. The welded spots on the outer rim do not invite damages of insulation, and eddy current thus does not increase, which keeps the motor efficient. As a result, the third embodiment can provide a small, efficient and high performance motor using a concentrated winding stator in a simple structure.

Fourth Exemplary Embodiment

Figure 6:
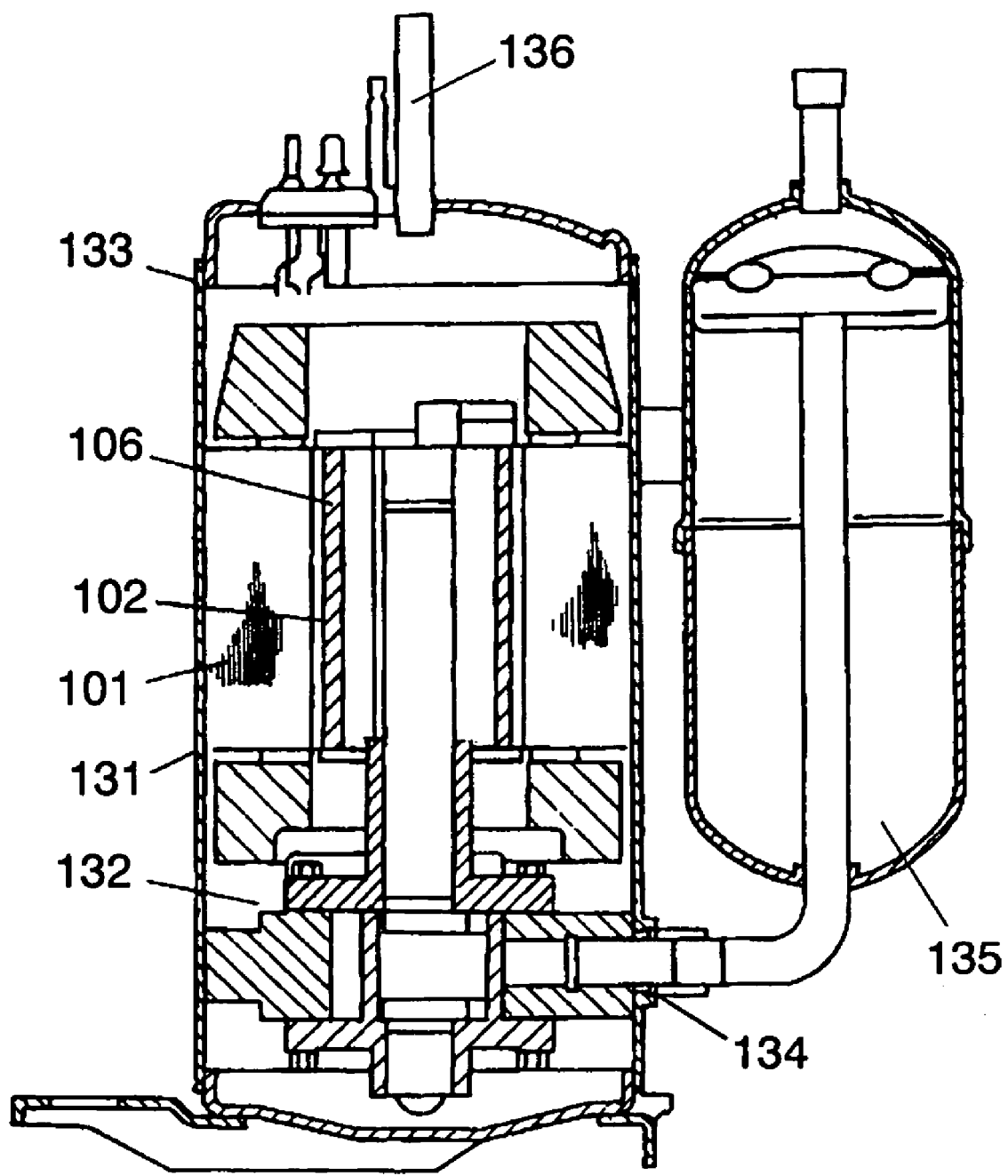
FIG. 6 shows a structure of a compressor in accordance with a fourth exemplary embodiment of the present invention.
Figure 7A:
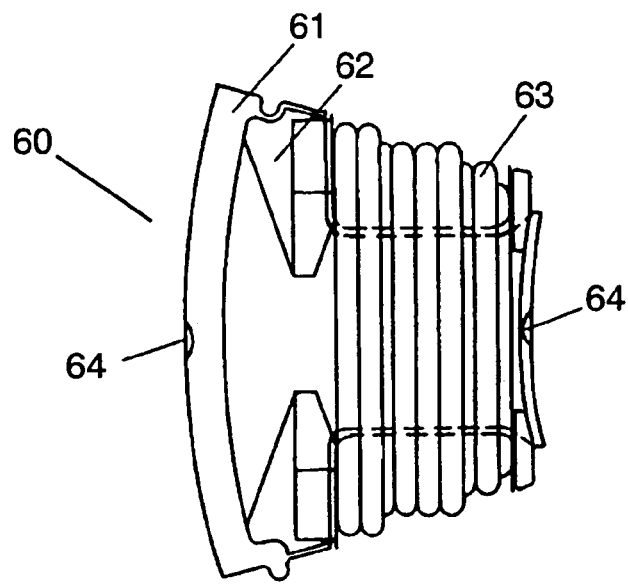
FIG. 7A is a front view of a conventional stator tooth.
Figure 7B:
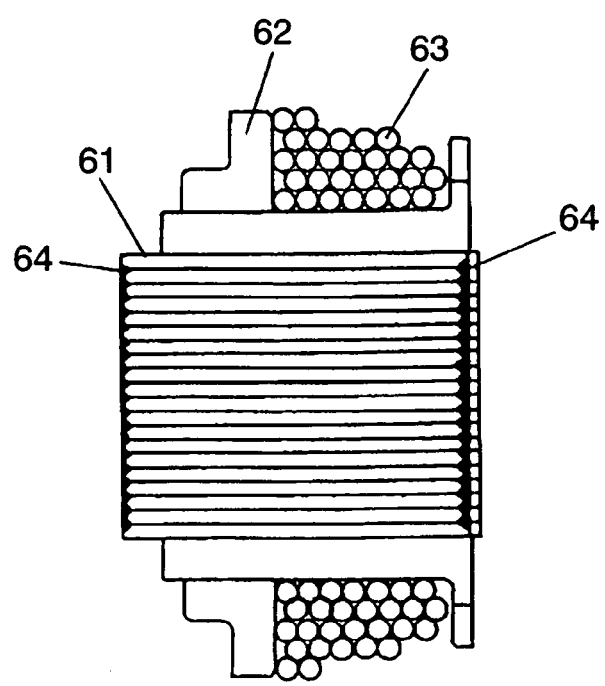
FIG. 7B is a sectional view of the stator tooth shown in FIG. 7A.

FIG. 6 illustrates a structure of a compressor in accordance with the fourth exemplary embodiment. In FIG. 6, motor 131 includes stator 101, rotor 102, and permanent magnets 106 disposed in rotor 102. Any structure of the motors demonstrated in the embodiments discussed previously is applicable to this compressor. Motor 131 and compressing section 132 are disposed in air-tight housing 133. Accumulator 135 is provided to suction pipe 134 of compressing section 132, and projecting pipe 136 is provided to an upper section of housing 133. The compressor is thus constructed. The present invention realizes a small, efficient and high performance compressor, which enjoys the advantages of motor 131.

What is claimed is:

1. A motor comprising:
   a stator formed by assembling a plurality of divided stator members into an annular shape; and
   a rotor facing the stator,
   wherein each of the divided stator members includes a stator teeth laminating a plurality of core sheets and a concentrated winding wound on the stator teeth via an insulator,
   wherein the core sheets are bonded to each other with an adhesive at an end surface of the stator teeth facing the rotor, and are welded to each other at another end surface of the stator teeth except a section facing the rotor.

2. A motor of claim 1, wherein the adhesive is infiltrated into the end surface of the stator teeth.

3. A motor of claim 2, wherein the adhesive has a low viscosity not more than 100 mPa·S.

4. A motor of claim 1, wherein the another end surface is an end surface of the stator teeth facing opposite to the rotor.

5. A motor of claim 1, wherein the stator is formed by linking the divided stator members adjacent to each other by welding.

6. A compressor incorporating a motor, wherein the motor comprising:
   a stator formed by assembling a plurality of divided stator members into an annular shape; and
   a rotor facing the stator,
   wherein each of the divided stator members includes a stator teeth laminating a plurality of core sheets and a concentrated winding wound on the stator teeth via an insulator,
   wherein the core sheets are bonded to each other with an adhesive at an end surface of the stator teeth facing the rotor, and are welded to each other at another end surface of the stator teeth except a section facing the rotor.

7. A compressor of claim 6, wherein the adhesive is infiltrated into the end surface of the stator teeth.

8. The compressor of claim 7, wherein the adhesive has a low viscosity not more than 100 mPa·S.

9. The compressor of claim 6, wherein the another end surface is an end surface of the stator teeth facing opposite to the rotor.

10. The compressor of claim 6, wherein the stator is formed by linking the divided stator members adjacent to each other by welding.

* * * * *